United States Patent [19]

Cammarota

[11] 3,987,459

[45] Oct. 19, 1976

[54] ELECTRO OPTICAL SYMBOL EMITTING AND RECOGNITION DEVICE

[76] Inventor: Andrew Anthony Cammarota, 30 Park Ave., New York, N.Y. 10016

[22] Filed: Aug. 11, 1975

[21] Appl. No.: 603,744

[52] U.S. Cl. .................................................. 354/12
[51] Int. Cl.[2] ........................................ G03B 17/04
[58] Field of Search .................. 313/465; 354/5, 17, 354/3, 13, 7, 12

[56] References Cited
UNITED STATES PATENTS

| | | | |
|---|---|---|---|
| 2,699,101 | 1/1955 | Ferguson et al. | 354/17 |
| 3,074,328 | 1/1963 | Rossetto et al. | 354/17 |
| 3,499,112 | 3/1970 | Heilmeier et al. | 313/465 |
| 3,710,698 | 1/1973 | Sinnott et al. | 354/7 |
| 3,824,604 | 7/1974 | Stein | 354/5 |
| 3,836,917 | 9/1974 | Mee | 354/5 |

OTHER PUBLICATIONS

I.B.M. Technical Disclosure Bulletin Character Checker, Cobb, vol. 11 No. 10, 3/1969, pp. 1357 & 1358.

Primary Examiner—Donald A. Griffin

[57] ABSTRACT

A solid state electro optical symbol emitting and symbol recognition device employing a source of collimated and parallel light for projecting an image, a symbol matrix of photographic film containing the symbols such as alphanumeric font that is to be projected, displayed or recognized by comparing it to a symbol of established equivalence, a liquid crystal symbol gate under the control of a central processor, a symbol display unit capable of receiving a symbol and projecting it to a multiplicity of positions on its output side and to a recognition unit, a second liquid crystal symbol gate under the control of a central processor and an output medium such as a xerographic printer, a light sensitive printing plate or a display screen. In addition the device may contain a recognition unit capable of comparing a symbol emitted by the device as previously described with a symbol emitted from its symbol matrix to establish their congruency and consequently the identity of the symbol read.

6 Claims, 7 Drawing Figures

ELECTRO OPTICAL SYMBOL EMITTING AND RECOGNITION DEVICE

FIELD OF THE INVENTION

This invention relates to the printing, display or recognition of graphic symbols onto or from various mediums.

In the sense that a photo enlarger can manipulate an image formed by passing light through a photographic film so as to form an image of selected size and to print that image onto a medium this invention contemplates selecting portions of the image formed and printing or displaying that portion of the image selected to a selected portion of the medium. In addition this invention can determine if an image reflected into it matches an image stored within it.

The use of this device will permit the printing of a symbol to a given medium and its immediate retrival and recognition. Among the many fields of the invention are data processing, printing processes, motion picture animation and graphic display. Additionally this device could also be incorporated into a system to provide for the remote display of graphic symbols without their unauthorized interception.

BACKGROUND OF THE INVENTION

High speed printers, optical character scanners and data display devices of several types have been developed and are in use. Most of these devices are dedicated to a particular application or system. In addition most of these devices are mechanical at least in part and suffer the limitations of mechanical devices as compared to electronic devices. Mechanical printers are reaching the upper limits of their effective speed because of their reciprocating action. The principal of hammering a symbol onto a medium has its limits in the laws of physics. It takes more energy to start and stop a mass hundreds of times per second no matter how small the mass than to start and stop a beam of light.

At present printers while reliable do not read check their output. If a defect such as a blot, a wood chip or a hole in the paper output medium caused the loss of a character the system would be unaware of such loss.

Optical character scanners in present use require that particular fonts be employed and that those fonts be recognized through extensive manipulation of the image and through extensive computer processing.

Data display devices in present use require many signals to be employed in transmitting symbols from the central processor to the display device. Actually the symbol is represented and stored in the central processor as a configuration of binary bits. Its output in graphic form requires a multiplicity of signals and computer instructions relating to its identity, its construction and its output position.

Some recent U.S. patents in the field of the invention are: 3,824,604 — Stein, which discloses a solid state printing system employing a liquid crystal matrix to form characters. Unlike the present invention the system disclosed in said patent, considering the printer aspect of the present invention alone, uses a liquid crystal matrix to form the symbols and fiber optics to transmit the symbols, while the present invention uses liquid crystals to gate the symbol images and projects the images to the output medium. Other patents of interest are; U.S. Pat. No. 3,693,517 — Clark, which discloses an electro mechanical printing device, U.S. Pat. No. 3,626,830 — Sobottka, et. al., which discloses an electro mechanical printing device, and U.S. Pat. No. 3,499,112 — Heilmeier, which discloses an electro optical display device which does not contemplate the same application as the present invention but does utilize liquid crystals in a manner suggestive of a television system. The patentee uses liquid crystals to modulate light as opposed to the gating of light. Also of interest are U.S. Pat. No. 3,453,648 — Stegenga, which discloses a thermal printing device, and U.S. Pat. No. 3,354,817 — Sakurai, et. al., which discloses a thermal printing device.

OBJECTS OF THE INVENTION

An object of the present invention is to provide a means of printing and reading graphic symbols through the use of a compact solid state device capable of being incorporated into various systems.

Another object is to provide a device for incorporation in a xerographic copier to in effect convert it into a high speed printer to provide a means for printing and reading graphic symbols in accordance with the preceding objects.

Another object is to incorporate into the present invention a signal detector, a microprocessor, a power source and a display screen to provide a remote output of data or graphic display.

Another object is to incorporate into the present invention a signal transmitter, a signal detector, a microprocessor, a power source, a display screen and a hard copy output medium to provide remote output of data or graphic display with ability to transmit data back to the source of the incoming data.

Another object of the present invention is to incorporate a source of radiation other than visible light such as ultraviolet light or infrared light for the purpose of forming symbols directly on mediums sensitive to said radiation.

Another object of the present invention is to incorporate it into a high speed printer to enable said printer to read check its output.

SUMMARY OF THE INVENTION

Briefly stated, the present invention relates to a device which takes symbols stored within it and emits images of those symbols to selected positions of an output medium. In addition it has the capability of reading those images of said symbols or their duplicates.

The aforementioned is accomplished through the use of a source of light, a symbol matrix, a symbol selector, a symbol display unit, a position selector and an output medium. In addition it may contain a recognition unit to provide for the recognition of symbols stored within its symbol matrix.

DETAILED DESCRIPTION OF THE PREFERRED EMBODIMENT OF THE INVENTION

Figure 1:
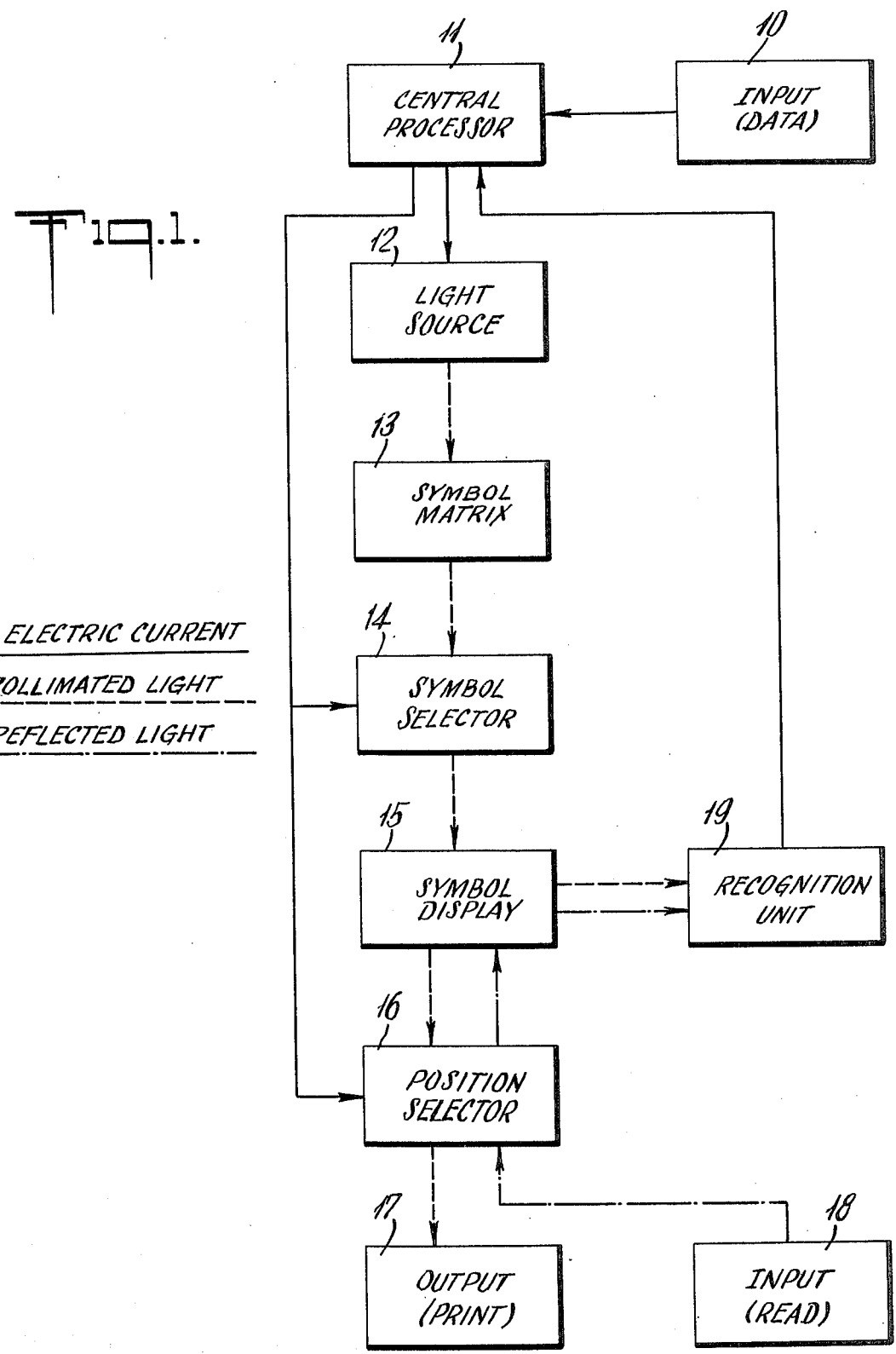
FIG. 1 is a block diagram illustrating the overall logic of a data processing system in accordance with the present invention.

Referring now to FIG. 1 there is shown a general block diagram of the present invention and its related equipment. Through the use of a keyboard, a punched card or other input to the Central Processor 11 it may be programmed with a table of codes to equate the symbols on the Symbol Matrix 13 with the positions of the Symbol Selector 14 so that by inputting the symbol to the Central Processor 11 with an instruction to print a given symbol the Central Processor 11 will open that position of the Symbol Selector 14 which will permit that symbol image to pass through.

The Light Source 12 is turned on by the Central Processor 11 upon receipt of an appropriate signal. Its function is to provide a beam of collimated and parallel light for projecting the images of the symbols of the Symbol Matrix 13 to and through the Symbol Selector 14. The Light Source 12 could be a point source collimator, an expanded laser beam or an array of solid state lasers under the control of the Central Processor 11. The use of an array of lasers would negate the requirement for the Symbol Selector 14. This description will contemplate the use of a single light source for all symbol positions and the use of a Symbol Selector.

The present invention may suffer a high loss of light which would require a high degree of light input to achieve an acceptable degree of light output. It may be necessary to employ heat absorbing glass or to reflect out of the device the infrared emissions. This is not indicated in the drawings because it is neither unique or vital to an understanding of the device.

The Symbol Matrix 13 is a photographic film of the symbols to be emitted by the present invention. In the same manner as a photographic projector slide and as explained hereinafter the Symbol Matrix stores the symbols to be employed.

The Symbol Selector 14 is a liquid crystal optical gating unit under the control of the Central Processor 11. As explained hereinafter by applying electric current across the circuit embedded in the unit in an appropriate manner the Central Processor 11 can select the position of the Symbol Selector 14 to be rendered transparent permitting the desired symbol to pass through to the Symbol Display 15.

The Symbol Display 15 receives an image of a symbol as previously described on its input side and through the use of a multiplicity of partially reflecting and transmitting surfaces placed at a forty-five degree angle to the incident light beam reflects or transmits the image of the symbol to the Recognition Unit 19 and to all of the positions of its output side.

Figure 5:
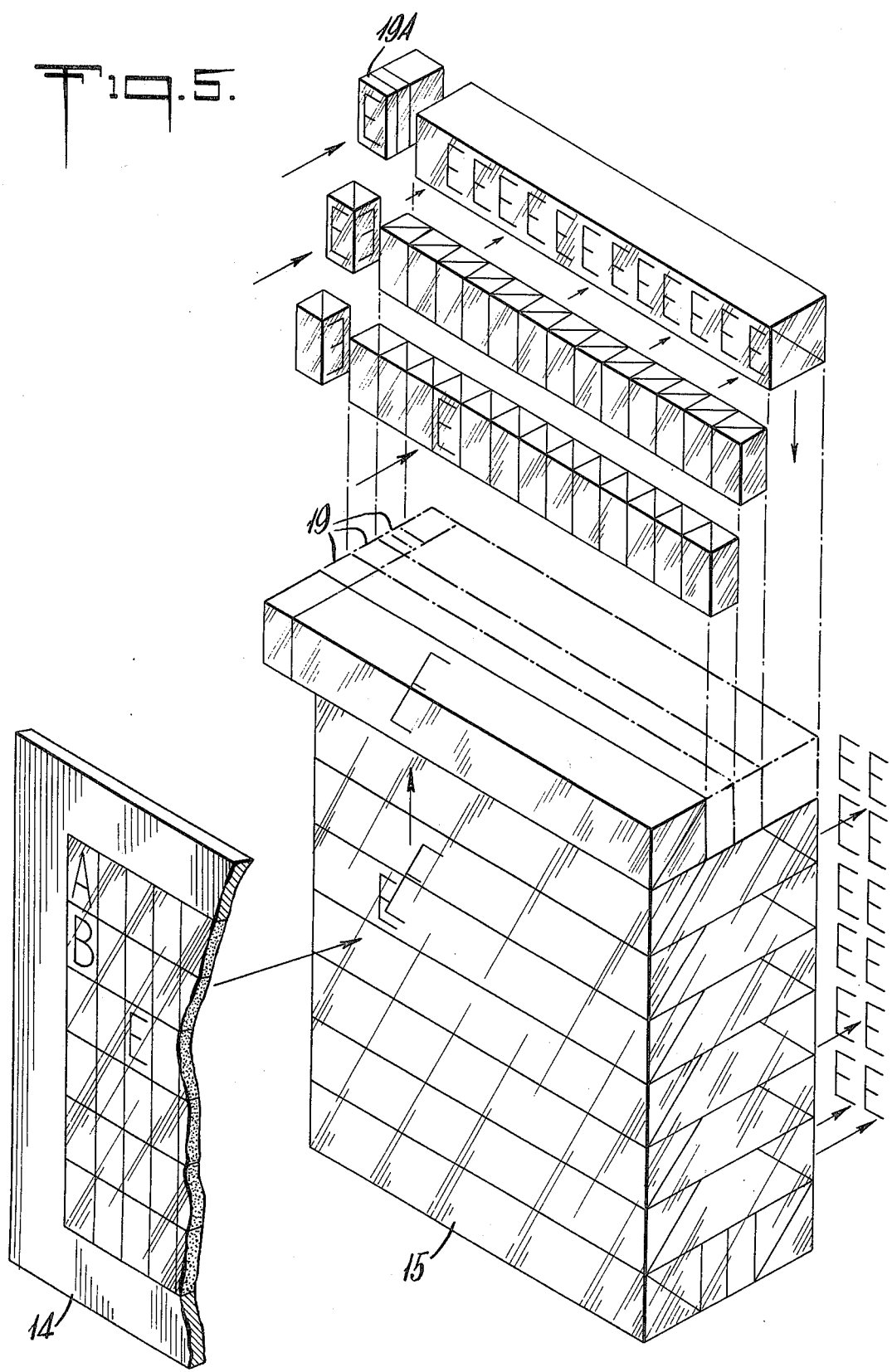
FIG. 5 is an isometric projection of the Symbol Display of the system shown in FIG. 1 with a portion of the Symbol Selector indicated thereon.

The Symbol Display 15 in effect multiplies the image of the symbol it receives on its input side by reflecting or transmitting said image and consequently projecting many images so formed to all of the output side positions of the Symbol Display 15 at proportionally diminished light intensity. FIG. 5 indicates a seventy-two position input and output Symbol Display which would be capable of taking seventy-two symbols and emitting any one of them to any one of seventy-two positions.

Right angle optical prisms cemented and coated at the hypotenuse to form a beam splitter of appropriate reflectance and transmittance or low refractive index transparent material bearing the proper coating at the appropriate reflecting surface may be employed to construct this unit.

The Position Selector 16 of the present invention is used to select the position through which the image of the selected symbol will be transmitted blocking all other images being projected by the Symbol Display's output side. The position Selector 16 accomplishes the aforementioned in the same manner as the Symbol Selector 14 that is by applying an electric current across the grid embedded in the unit, said current being controlled by the Central Processor 11. The Symbol Selector 14 and the Position Selector 16 are essentially the same only their logical functions are different.

Once the image of a symbol passes through the Position Selector 16 it is in effect emitted from the present invention. Depending on the application of the present invention the output medium can be any one of several. Among the output mediums contemplated are xerographic printers, light sensitive printing plates, microfilm cameras and display devices.

The Document Input Unit 18 is used only in those applications that require the recognition of a symbol as hereinafter described.

The present invention is capable of recognizing a symbol that was either previously emitted by it or formed congruent to a symbol contained in its Symbol Matrix 13. To accomplish recognition the medium containing the symbols to be recognized must be positioned in a disciplined manner so that the positions of the characters on the document may be equated to the positions of the Position Selector 16. The symbols, characters, on the document are illuminated so that their images are reflected into the present invention to all positions of the Position Selector 16. However, all the positions of the Position Selector 16 are opaque with the exception of that position made transparent by the Central Processor 11. Consequently the selected image, the image in the selected position, is projected to the Symbol Display's output, which in the reader mode is an inputside, and is consequently reflected to the Recognition Unit 19 where it is compared with a symbol image being emitted as previously described.

The symbol that is being read, the image of the symbol from an outside medium, remains in the Recognition Unit 19, the Central Processor 11 does not change the position being read by the Position Selector 16, until recognition is accomplished. Recognition as explained hereinafter being the matching of a symbol emitted by the present invention and a symbol reflected into the present invention. In the event that the Central Processor 11 caused all symbols to be emitted without achieving recognition the program stored within the Central Processor 11 would contain the necessary instructions to take the appropriate action such as stop or indicate error and continue.

The Recognition Unit 19 detects a congruent symbol image by measuring the uniformity of light intensity on a recognition screen contained in the Recognition Unit 19 and by signaling the Central Processor 11 accordingly. The recognition screen consists of a matrix of microphotoelectric detectors connected to the Central Processor 11.

Figure 2:
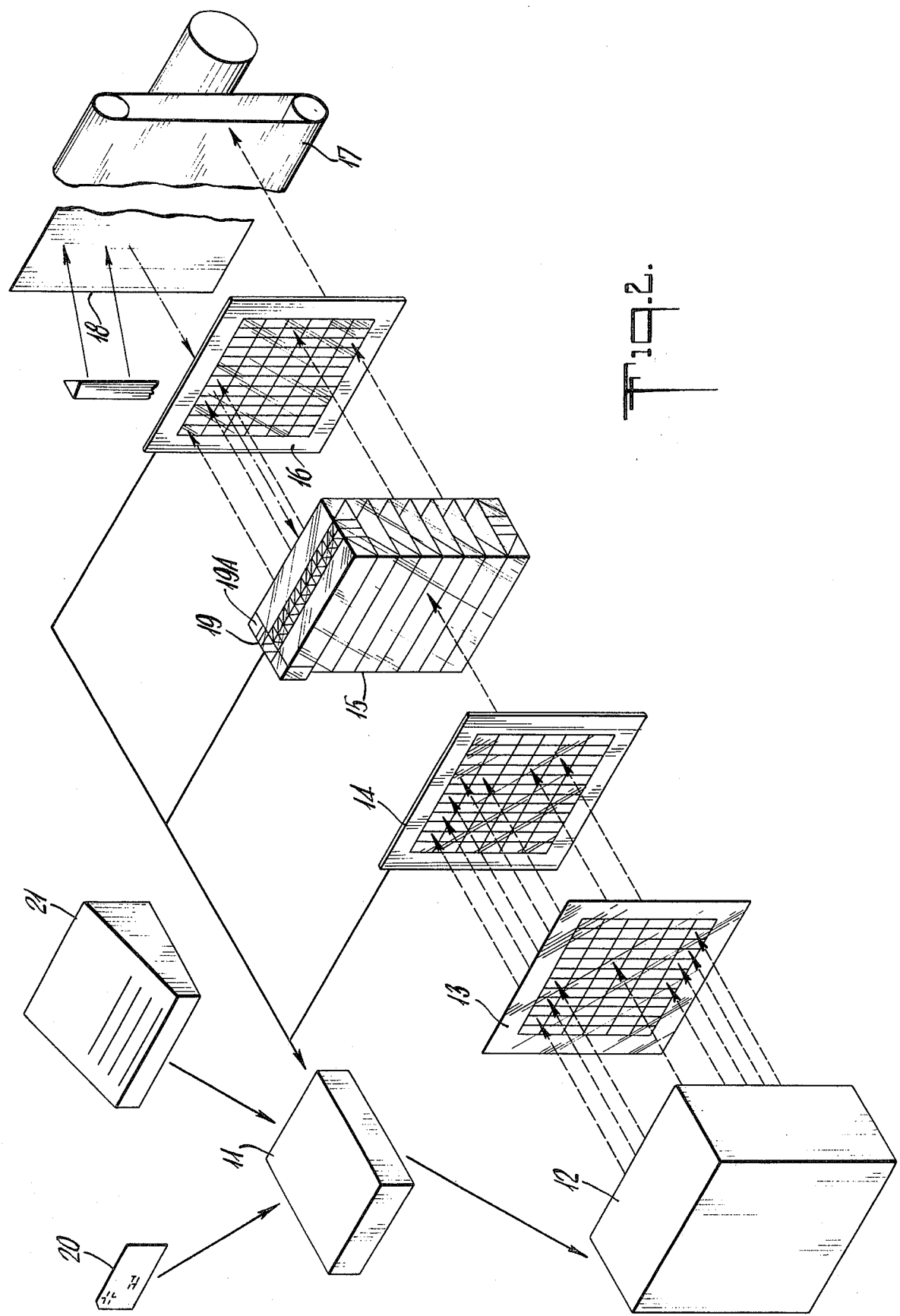
FIG. 2 is a schematic illustration of a system in accordance with the present invention shown in FIG. 1 showing an exploded isometric view of the Electro Optical Symbol Emitting and Recognition Device with the symbol transmission path indicated thereon.

Referring now to FIG. 2, an exploded view of the present invention and its related equipment, a punch card 20 and a keyboard 21 is illustrated to indicate that these devices may be used to enter data to the Central Processor 11. The Central Processor 11 would store in its memory the table of symbols and their equivalent bit configurations, the computer addresses of the elements of the Recognition Unit's recognition screen 19A and the computer addresses of the positions of the Symbol Selector and the Position Selector.

Under program control the Central Processor 11 will be able to turn on the Light Source 12, control the Symbol Selector 14, control the Position Selector 16 and receive signals from the Recognition Unit's recognition screen 19A.

The Light Source 12, which can be a point source collimator, an expanded laser beam or an array of small solid state lasers, one laser for each position of the Symbol Matrix 13, projects a beam of light through the Symbol Matrix 13, which is a photographic film of the symbols to be employed, the font, of the present invention. These symbols could be alphanumeric characters or any other graphic representation in either a positive or negative manner or both depending on the application of the present invention.

The beam of light would carry all of the symbol images contained in the Symbol Matrix 13 and would project said images to the Symbol Selector 14.

The Symbol Selector 14 is a thin two dimensional array of a plurality of optical gating devices consisting of liquid crystals each of which is normally opaque and is capable of being rendered selectively transparent in response to electrical stimulation. The Symbol Selector is so wired that only one gate can be sufficiently energized by the Central Processor 11 and rendered transparent thereby permitting the selected symbol to be projected to the input side of the Symbol Display 15.

It is the function of the Symbol Display 15 as explained hereinafter to reflect or transmit the selected symbol to the Recognition Unit 19 and to all of the positions on the output side of the Symbol Display 15 consequently projecting the selected symbol to all of the positions of the Position Selector 16.

The Position Selector 16 is identical to the Symbol Selector 14 in all physical aspects but serves a different logical function in the present invention. Its purpose is to select under the control of the Central Processor 12 the position where the symbol will be emitted rather than which symbol will be emitted.

The Recognition Unit 19 which gives the present invention the capability of recognizing congruent symbols is not a prerequisite to the use of said invention in the emitter, printer, only mode of operation.

The Output 17 as previously cited can be any one of several mediums depending on the application of the present invention.

The Input 18 illustrates the medium containing the symbols to be read by the present invention in those applications where applicable.

Figure 3:
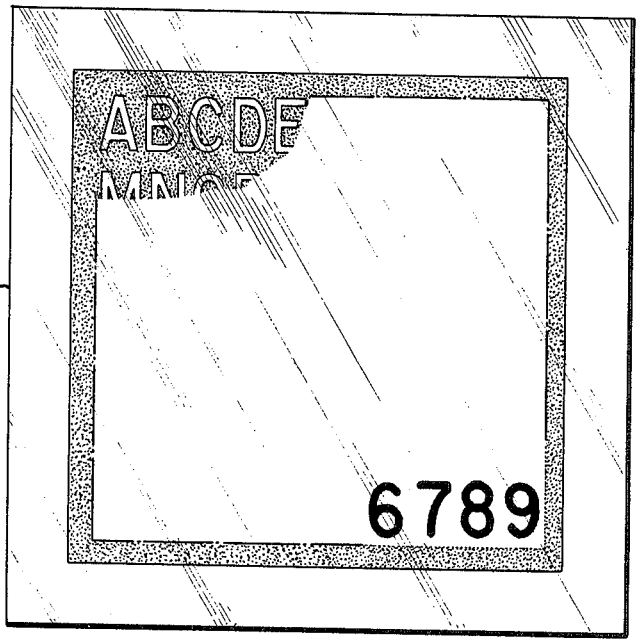
FIG. 3 is a front view of the Symbol Matrix of the system shown in FIG. 1.

Referring now to FIG. 3, there is shown the Symbol Matrix 13 which contains the photographic images of the symbols to be employed by the present invention. This unit could be incorporated into the present invention as a fixed slide, as a removable slide or it could be a frame of continuous film in a unit similar to a motion picture projector to provide for high speed change of the Symbol Matrix 13 under the control of the Central Processor 11.

Figure 4:
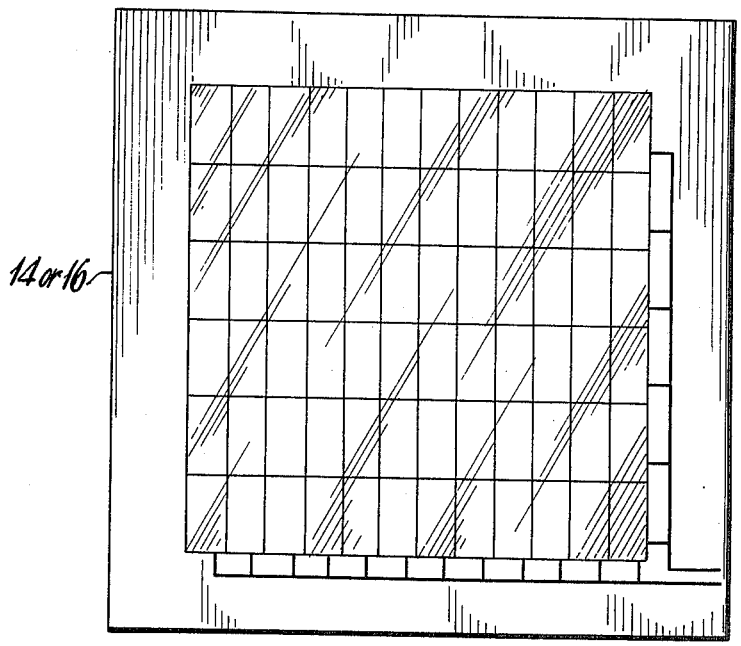
FIG. 4 is a front view of the Symbol Selector or the Position Selector of the system shown in FIG. 1. Both units are identical.

Referring now to FIG. 4, both the Symbol Selector 14 and the Position Selector 16 are represented by the single illustration since as previously mentioned they are identical. These units are constructed of a thin film of liquid crystal sandwiched between layers of transparent material which have been etched to provide for the segmentation of the surface area into discrete positions to form a matrix of optical gates having the same number and orientation as the positions of the Symbol Matrix 13 of the present invention. In addition said surface area to be etched and filled with electrical conducting material to form a circuit so connecting said discreet grid positions so that a signal from the Central Processor 11 would be capable of rendering one of said grid positions transparent all others remaining opaque.

Referring now to FIG. 5, an isometric projection of the Symbol Display 15 with a portion of the Symbol Selector 14 indicated thereon, the symbol "E" is illustrated as it would pass through the Symbol Selector 14 as previously described. The Symbol Display 15 can be described as a complex beam splitter prism in which the beam splitting surfaces are placed at a forty-five degree angle to both the horizontal and vertical planes of the unit built from said prisms. All of the partially reflecting surfaces with the exception of those surfaces which are outermost to the unit are so coated to provide for one-half light transmission through the said surface and one-half reflection from said surface. The surfaces at the outermost positions will be so coated as to provide total reflectance. The aforementioned positioning of said surfaces will cause a beam of light carrying an image of a symbol to be split into two beams at each surface other than an outermost surface and the resultant beams to be similarly split at each surface or to be totally reflected at the outermost surfaces which will enable the Symbol Display of the present invention to emit the image carrying light beam only at the surfaces opposite to the surface at which the original light beam entered said Symbol Display 15.

In FIG. 5 the symbol "E" is illustrated as it would be passed through as previously described and thence be reflected and transmitted to both the Recognition Unit 19 and to the output surfaces of the Symbol Selector 14 and be thereby emitted.

The Symbol Display 15 can be constructed from right angle optical glass prisms coated and cemented together at the hypotenuse to form a beam splitter or of other transparent material capable of supporting or forming a partially reflecting surface. Certain parts of the Symbol Display 15 will be coated with light absorbitive coatings to eliminate unwanted light reflections and transmissions. This has not been indicated in the drawings for purposes of clarity.

Figure 6:
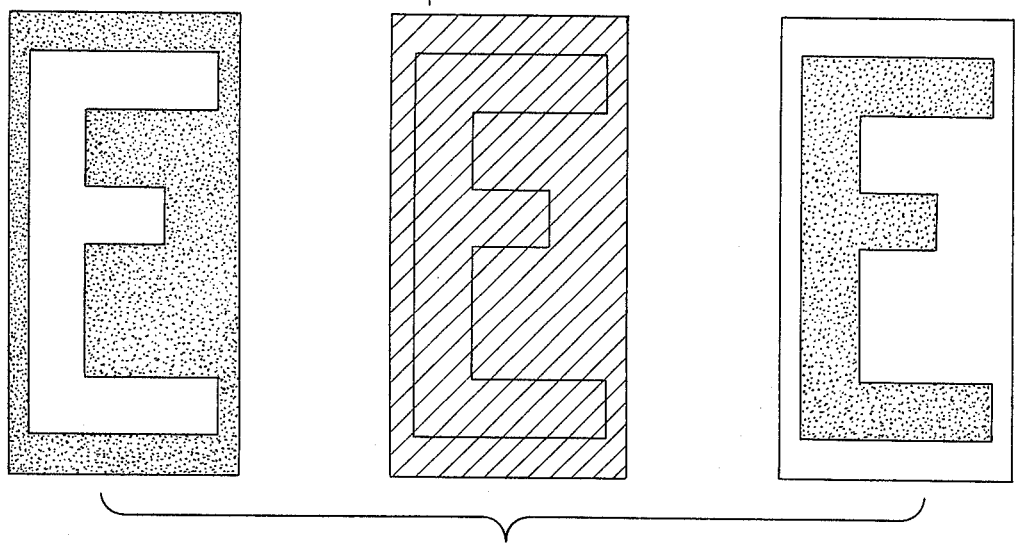
FIG. 6 illustrates the concept of congruent symbols. A negative image of the symbol "E", said symbol overlayed with the positive image of said symbol and the positive image of said symbol respectively as they would appear on the partially reflecting surfaces of the Recognition Unit shown in FIG. 7.

Referring now to FIG. 6 the negative image of the character "E" is illustrated as it would be transmitted as previously described to the recognition screen 19A of the Recognition Unit 19. Also illustrated is the positive image of the character "E" as it would be transmitted to the recognition screen 19A from the output side of the Symbol Display 15 after being reflected into the device through the Position Selector 16. The recognition screen 19A is illustrated with both of the aforementioned images superimposed on said unit. This condition will cause the Central Processor 11 to achieve recognition of the symbol.

Figure 7:
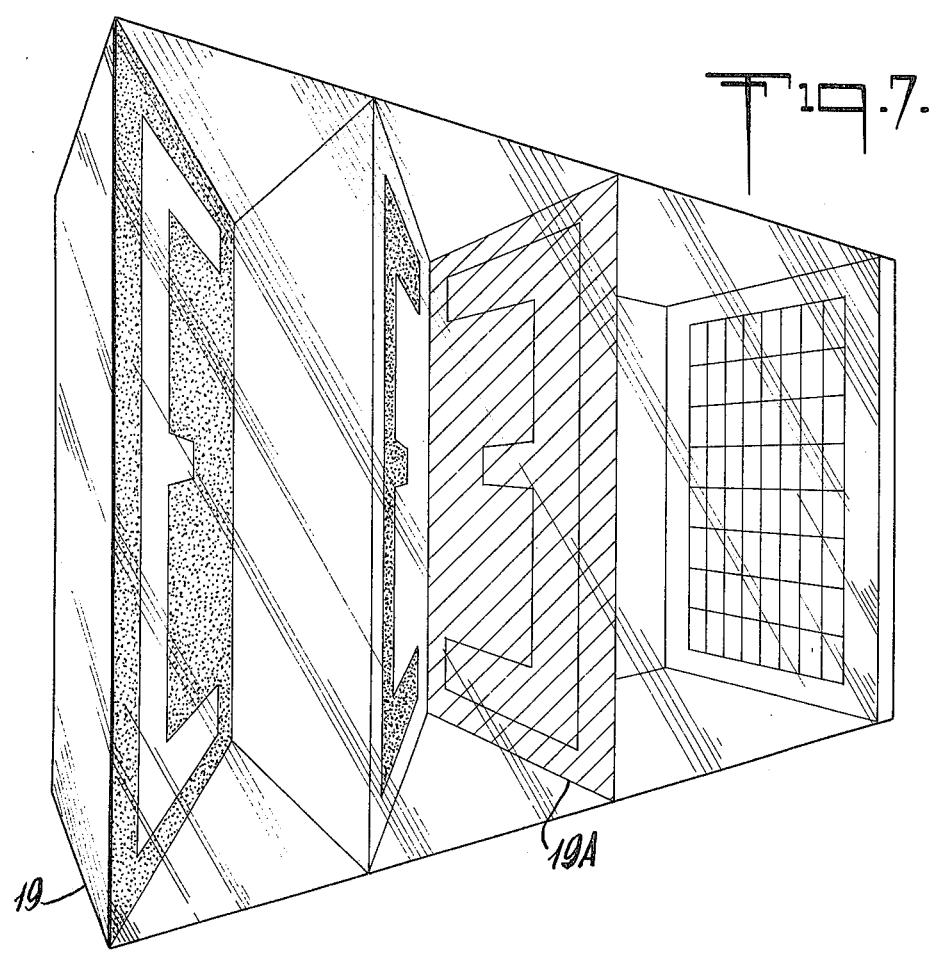
FIG. 7 is a perspective view of the Recognition Unit of the system shown in FIG. 1 with the recognition screen indicated as a grid of miniphotoelectric detectors.

Referring now to FIG. 7 the Recognition Unit 19 is illustrated in a perspective view with the recognition screen indicated as a grid of miniphotoelectric detectors. The reflecting surface on the Symbol Selector 14 side on the Recognition Unit 19 is fully silvered and consequently reflects all of the light transmitted to it to the partially silvered surface on the Position Selector 16 side of the Recognition Unit 19 consequently part of the said light is transmitted through said partially reflecting surface to the recognition screen 19A of the Recognition Unit 19 and part of said light is reflected to the output side of the Recognition Unit 19. The aforementioned enables the present invention to emit a symbol image from its Symbol Matrix 13 as previously described to the recognition screen of the Recognition Unit 19 consequently when a symbol image that is congruent and of opposite nature, negative vs positive, is reflected as previously described into the present invention and transmitted to the recognition screen 19A said screen is capable of signalling the Central Processor 11 that recognition has been achieved, that is that all of the miniphotoelectric detectors are receiving light of uniform flux or of sufficient uniformity that the Central Processor 11 as determined by its program parameters will accept the condition on the recognition screen 19A as the attainment of recognition of the symbol.

What is claimed is:

1. A system for automatically selecting from a matrix of symbols a given symbol corresponding to a predetermined input signal and for selectively outputting an image corresponding to said symbol, comprising: a source of light, a symbol matrix comprising a two dimensional array of a plurality of symbols each of which is capable of transmitting light in a pattern corresponding to the respective symbol, a gate matrix comprising a two dimensional array of a plurality of optical gating devices each of which is normally opaque and capable of being rendered selectively transparent in response to a first control signal, a position selector matrix comprising a two dimensional array of a plurality of optical gating devices each of which is normally opaque and capable of being rendered selectively transparent in response to a second control signal, a symbol display device having an input side capable of receiving an image of a given symbol in anyone of a plurality of input positions corresponding to the position of an image projected thereon from said light source through one of the symbols on the symbol matrix, as determined by a selected one of the optical gating devices of the gate matrix, and having an output side which is capable of projecting said image simultaneously onto a plurality of the gating devices of said optical position selector matrix, and a central processor including means for producing a first signal for selectively rendering transparent a selected one of the normally opaque gating devices of said gate matrix opposite a selected symbol of said symbol matrix, thereby projecting an image of said symbol onto said position selector, and means for producing a second signal for selectively rendering transparent a selected one of the gating devices of said position selector matrix, thereby projecting an image corresponding to said selected symbol to an output medium in a selected output position.

2. A system as defined in claim 1 further comprising a means for determining whether or not the image of a symbol transmitted back through a selected gate of the position matrix onto the output side of the symbol display device corresponds to a selected symbol of the symbol matrix, comprising a means for comparing an image of a selected one of the symbols in said symbol matrix with said image of the symbol transmitted back through the then selected gate of the position matrix, said comparing means including means for overlaying a negative image of a selected one of said symbols of said symbol matrix with the said image transmitted back through the selected gate of said position matrix.

3. A system as in claim 2 further comprising means for selectively comparing images of successive one of said symbols of said symbol matrix and for successively outputting a signal when the congruence of the negative image of one of said symbols of said symbol matrix corresponds to the symbol reflected back.

4. A system as defined in claim 1 wherein the optical gating devices of said symbol matrix are liquid crystal gating devices.

5. A system as defined in claim 1 wherein the optical gating devices of said position selector matrix are liquid crystal gating devices.

6. A system as defined in claim 1 wherein the output medium comprises a xerographic printer.

* * * * *